No. 864,372. PATENTED AUG. 27, 1907.
R. HOFFMANN & F. W. PLEINES.
DETACHABLE HANDLE FOR POTS, KETTLES, &c.
APPLICATION FILED JUNE 17, 1907.
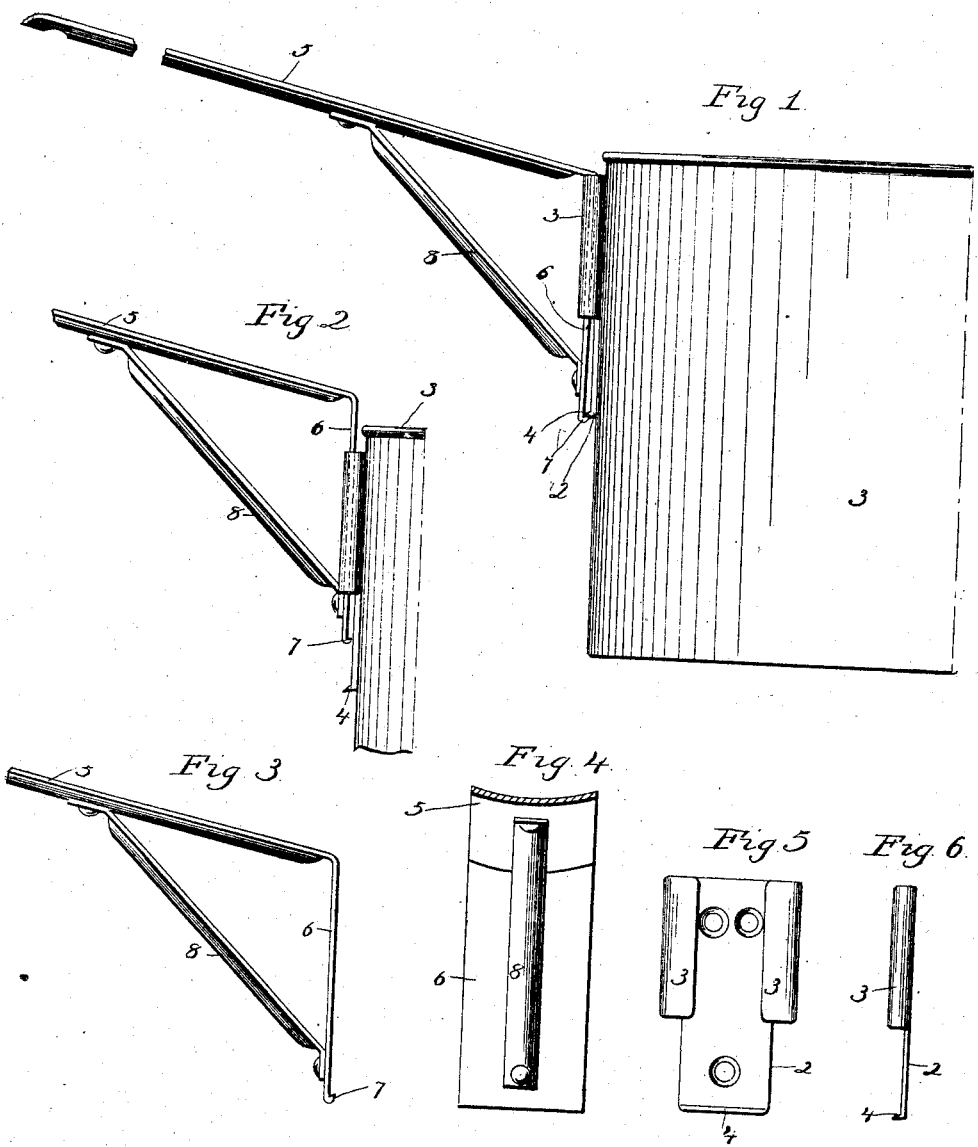

UNITED STATES PATENT OFFICE.

RUDOLPH HOFFMANN AND FREDERICK W. PLEINES, OF NEW HAVEN, CONNECTICUT.

DETACHABLE HANDLE FOR POTS, KETTLES, &c.

No. 864,372.  Specification of Letters Patent.  Patented Aug. 27, 1907.

Application filed June 17, 1907. Serial No. 379,372.

*To all whom it may concern:*

Be it known that we, RUDOLPH HOFFMANN and FREDERICK W. PLEINES, citizens of the United States, residing at New Haven, in the county of New Haven and State of Connecticut, have invented a new and useful Improvement in Detachable Handles for Pots, Kettles, &c.; and we do hereby declare the following, when taken in connection with the accompanying drawings and the letters of reference marked thereon, to be a full, clear, and exact description of the same, and which said drawings constitute part of this specification, and represent, in—

Figure 1 a side view of a detachable handle for pots and kettles constructed in accordance with our invention, and shown as applied to the side of a kettle. Fig. 2 a side view of the same, showing the handle partially disengaged from the kettle. Fig. 3 a side view of the handle detached. Fig. 4 an end view looking toward the arm. Fig. 5 a front view of the plate, detached. Fig. 6 a side view of the same.

This invention relates to an improvement in detachable handles for pots, kettles, &c., that is, a handle which may be attached to pots or kettles when required for use but which may be conveniently removed therefrom when the kettles are on the stove or not in use, or when they are packed for shipment or stored for sale, the object of the invention being a simple arrangement of parts which permits the ready attachment and removal of the handle; and the invention consists in the construction and combination of parts hereinafter described and particularly recited in the claims.

In carrying out our invention we attach a plate 2 to the pot or kettle 3 which may be of any form or size, and form the plate with wings 3 on opposite sides which wings are turned inward parallel with the face of the plate, but slightly offset therefrom. The bottom of the plate 2 is provided with an outwardly projecting lip 4. The handle 5, which is of the desired length, is formed with an arm 6 adapted to pass downward between the wings 3 and the plate, the arm being provided at its lower end with a flange 7 adapted to engage with the lip 4 of the plate 2. Preferably and as herein shown, a brace 8 will be secured to the handle 5 and arm 6 so as to give sufficient strength to the parts. When it is desired to attach the handle, the arm 6 is passed downward between the wings 3 and so that the flange 7 may engage with the underside of the lip 4. In this position if the pot or kettle is lifted by the handle, the weight of the pot will hold the lip and flange in engagement and thereby firmly connect the handle with the pot or kettle.

To remove the handle, if the pot or kettle rests upon the stove or other object, the lifting of the handle 5 upward toward the pot will throw the flange 7 out of engagement with the lip 4 and permit the arm to pass freely from engagement with the wings 3. A series of pots or kettles may be made all having the same size plates attached thereto so that one handle may be used for a number of pots or kettles.

We claim:—

The combination with a pot or kettle, of a plate secured thereto, said plate formed with inwardly projecting wings and with a lip at its lower end, and a handle having an arm adapted to pass downward between said wings and formed with a flange at its lower end adapted to engage with the lip on the plate, substantially as described.

In testimony whereof, we have signed this specification in the presence of two subscribing witnesses.

RUDOLPH HOFFMANN.
FRED. W. PLEINES.

Witnesses:
ALEXANDER CUMMING.
FREDERIC C. EARLE.